United States Patent [19]

Fisher et al.

[11] 4,002,311
[45] Jan. 11, 1977

[54] BELT TENSION ELIMINATOR FOR SEAT BELT SYSTEM

[76] Inventors: Robert C. Fisher, 4210 N. Dixie, West Palm Beach, Fla. 33407; Cecil A. Collins, 1355 Edgeorge, Pontiac, Mich. 48054

[22] Filed: Jan. 12, 1976

[21] Appl. No.: 648,400

[52] U.S. Cl. .................. 242/107.7; 180/82 C; 280/744

[51] Int. Cl.² ................ A62B 35/00; B65H 75/48

[58] Field of Search ....... 242/107.7, 107.6, 107.12; 280/744–747; 297/388; 180/82 C

[56] References Cited

UNITED STATES PATENTS

| | | | |
|---|---|---|---|
| 2,698,146 | 12/1954 | Becker | 242/107.7 |
| 3,384,108 | 5/1968 | Kern | 242/107.7 X |
| 3,490,715 | 1/1970 | Nicpon | 242/107.7 |
| 3,834,646 | 9/1974 | Heath | 242/107.7 |
| 3,851,836 | 12/1974 | Sprecher | 242/107.7 |

Primary Examiner—Stanley N. Gilreath
Assistant Examiner—John M. Jillions
Attorney, Agent, or Firm—Harness, Dickey & Pierce

[57] ABSTRACT

A safety belt mechanism of the spring-actuated spool type which includes mechanism for permitting belt protraction and retraction and with which an improved belt position control mechanism is combined to allow a limited protraction of the belt by the user after the belt has reached an initial position of protraction in a secured position against the user to accomplish, first, an easing of the belt pressure on the user and, second, the assumption of a locked position against retraction of the belt in that eased position until the belt is selectively released by the user.

8 Claims, 16 Drawing Figures

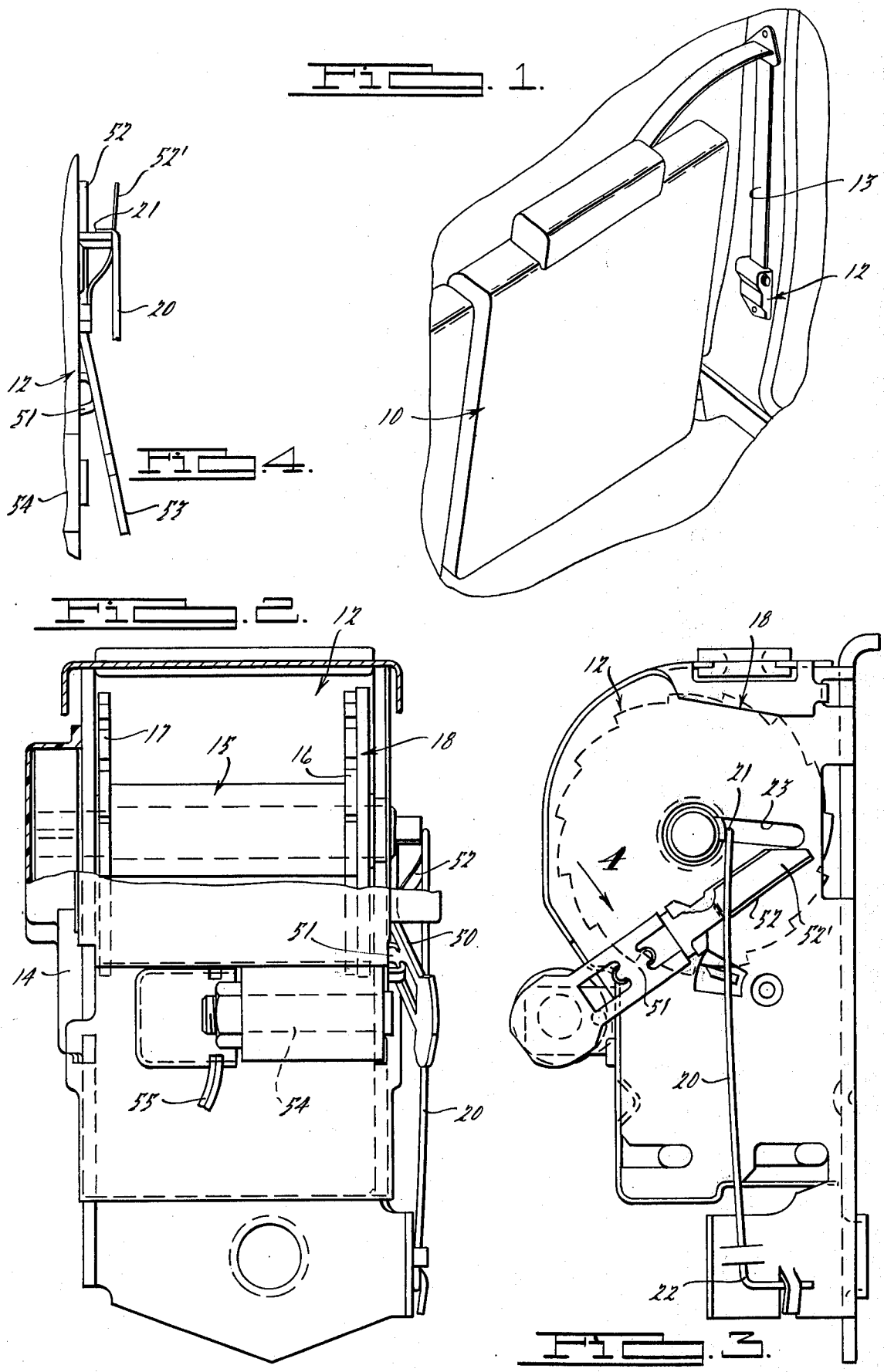

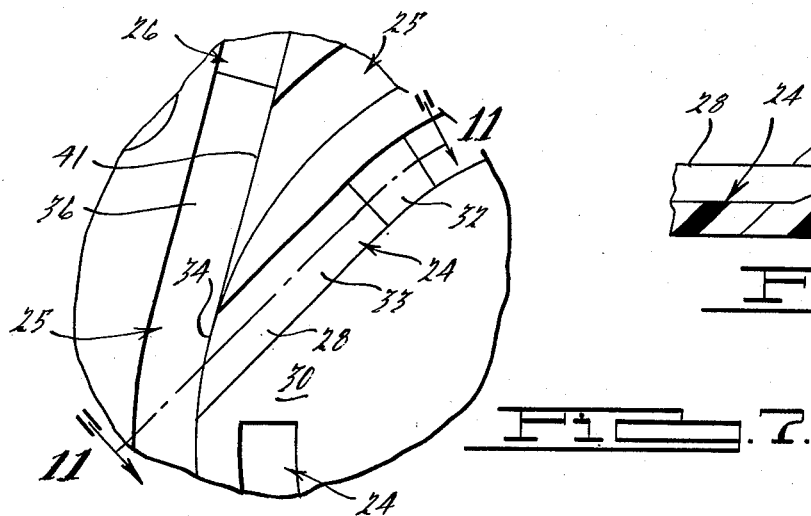
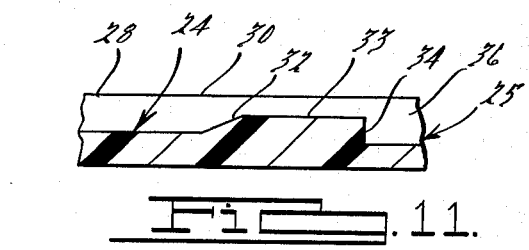
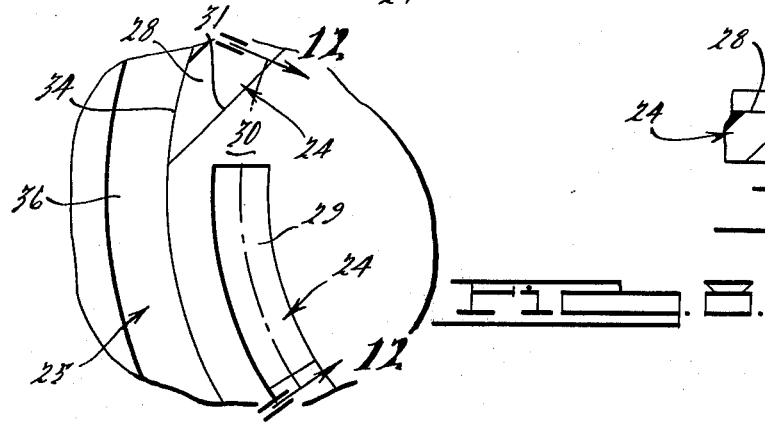
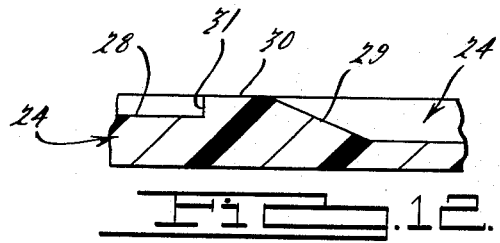
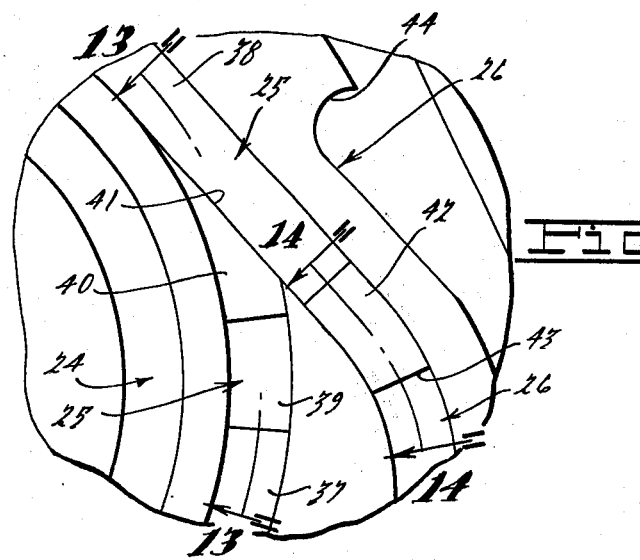
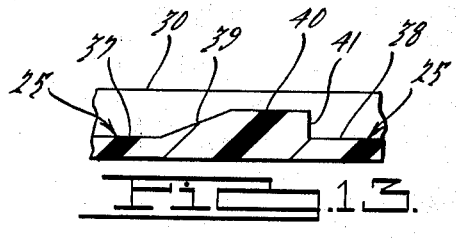
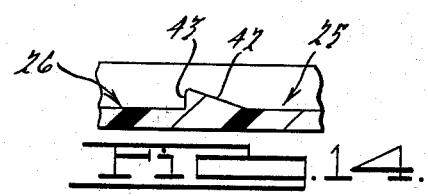
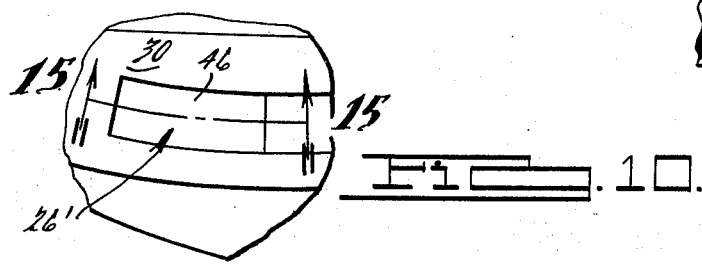
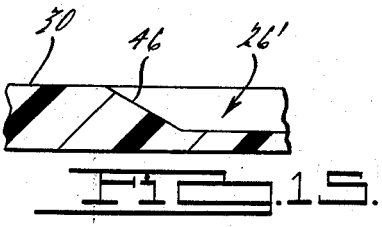

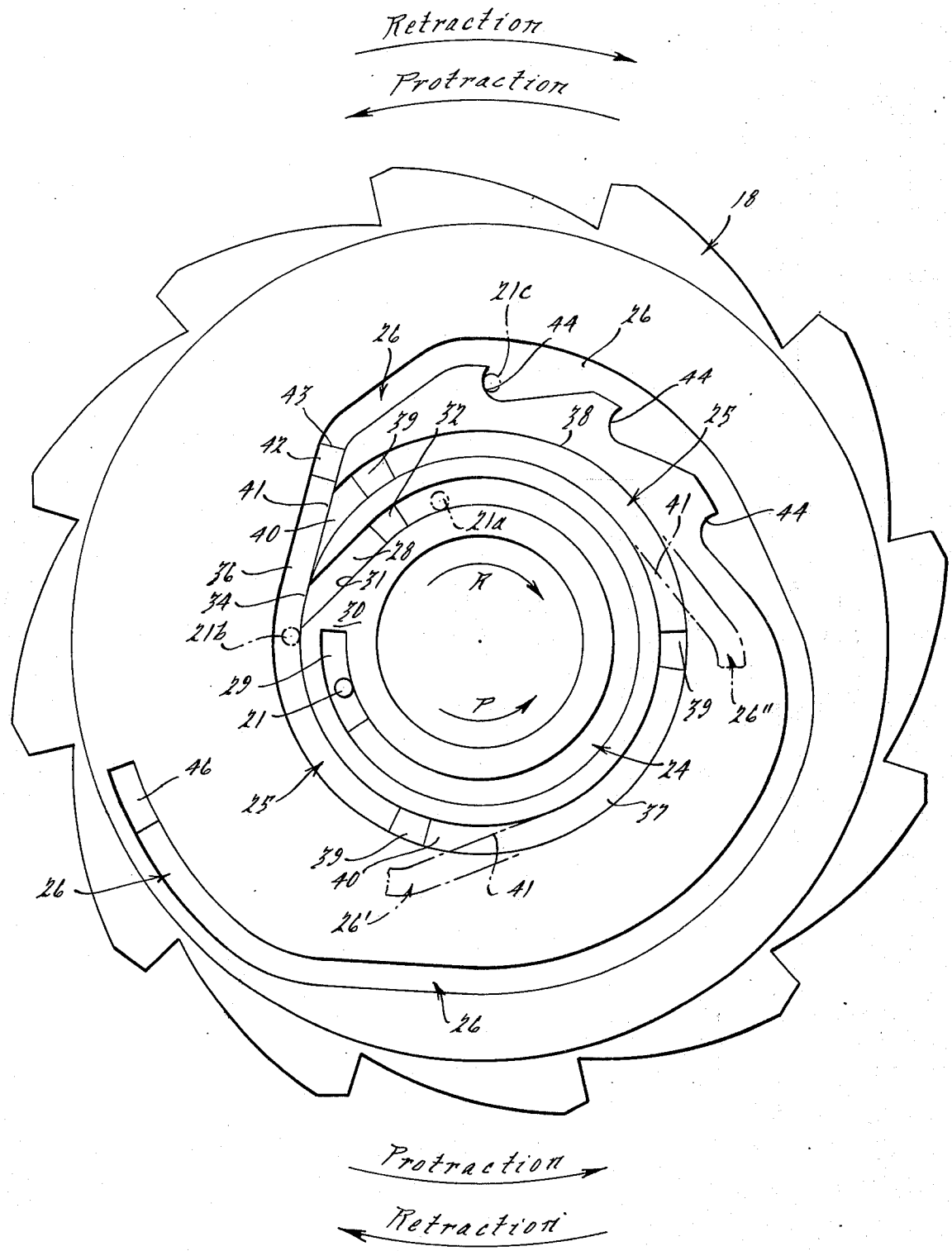

BELT TENSION ELIMINATOR FOR SEAT BELT SYSTEM

BACKGROUND OF THE INVENTION

In the usual safety belt mounting structures and in their normal use, the belt is protracted by the user to a position beyond that required when set, the end then clamped, the belt then allowed to retract against the body of the user, exacting pressure on the body of the user, and then be locked against further protraction to secure the user in the seat in the event of sudden change in vehicle movement. The pressure on and excessive confinement of the user, resulting from the use of conventional structures, produce uncomfortable effects needless to his safety.

SUMMARY OF THE INVENTION

In the structure of this invention, a slight protraction of the belt may be effected by the user, after the belt has assumed its initial confining position against the user following initial protraction, and then released to a position automatically locked against retraction. The pressure is releived and confinement is relaxed with the belt remaining in that locked position until released by a conscious act of the user.

These desirable results are accomplished by combining a control mechanism with one of the ratchet wheels of a spring-actuated reel-type retractor for a safety belt in which the reel-type retractor may be of the type controlled by electrical or inertia responsive devices, both known in the art.

An important part of the control mechanism of the present invention (in the specific form illustrated) is in the form of a plastic disc, generally of the same peripheral contour as the ratchet wheel to which it is attached, and is formed with tracks or races on the external face adapted to receive a spring follower and stop which rides in or slides in and cooperates with contours of the tracks or races to effect the controls hereinafter described.

There is formed in the disc a first circuitous track within which the end of a spring-stop follower travels during initial continuous protraction of the belt.

A second circuitous track is disposed outwardly of the first track and communicates with the first track to perform a double function; first, to receive the stop when the belt is initially retracted and pressed against the user following the initial protraction, and, second, to permit continous retraction of the belt when the belt is unlatched by the user and the belt is returned to the housing.

A third control track, which is in open communication with the second track is substantially a tangential direction and which forms a continuation of the second track (in the direction of protraction relative to the stop), receives the stop upon a continued but limited protraction of the belt effected by the user to relieve tension.

The control track has a ratchet stop which engages the stop when the belt is released by the user to lock the belt against further retraction until the stop is removed from such locking engagement either by an extensive continued protraction of the belt by the user or by a mechanical release operating in response to the user's unlatching the belt.

BRIEF DESCRIPTION OF THE DRAWINGS

FIG. 1 is a partial interior view of a vehicle showing a seat back and the retractor of the present invention;

FIG. 2 is a top plan view of the retractor shown in FIG. 1 with a portion of the casing removed and showing parts in elevation;

FIG. 3 is a side elevational view of the structure shown in FIG. 2 with a part of the casing removed;

FIG. 4 is a partial elevational view taken substantially in the direction of arrow 4 of FIG. 3;

FIGS. 7, 8, 9 and 10 are enlarged elevational views taken within the circles 7, 8, 9 and 10, respectively, of FIG. 5;

FIGS. 11, 12, 13, 14 and 15 are reduced cross-sectional views taken substantially along the lines 11—11, 12—12, 13—13, 14—14 and 15—15 as indicated in FIGS. 7, 8, 9 and 10;

FIG. 16 is a view similar to FIG. 5 but with certain of the track sections removed so that the essential control sections are clearly apparent with the additional track sections indicated in phantom.

DESCRIPTION OF THE PREFERRED EMBODIMENTS

Figure 5:
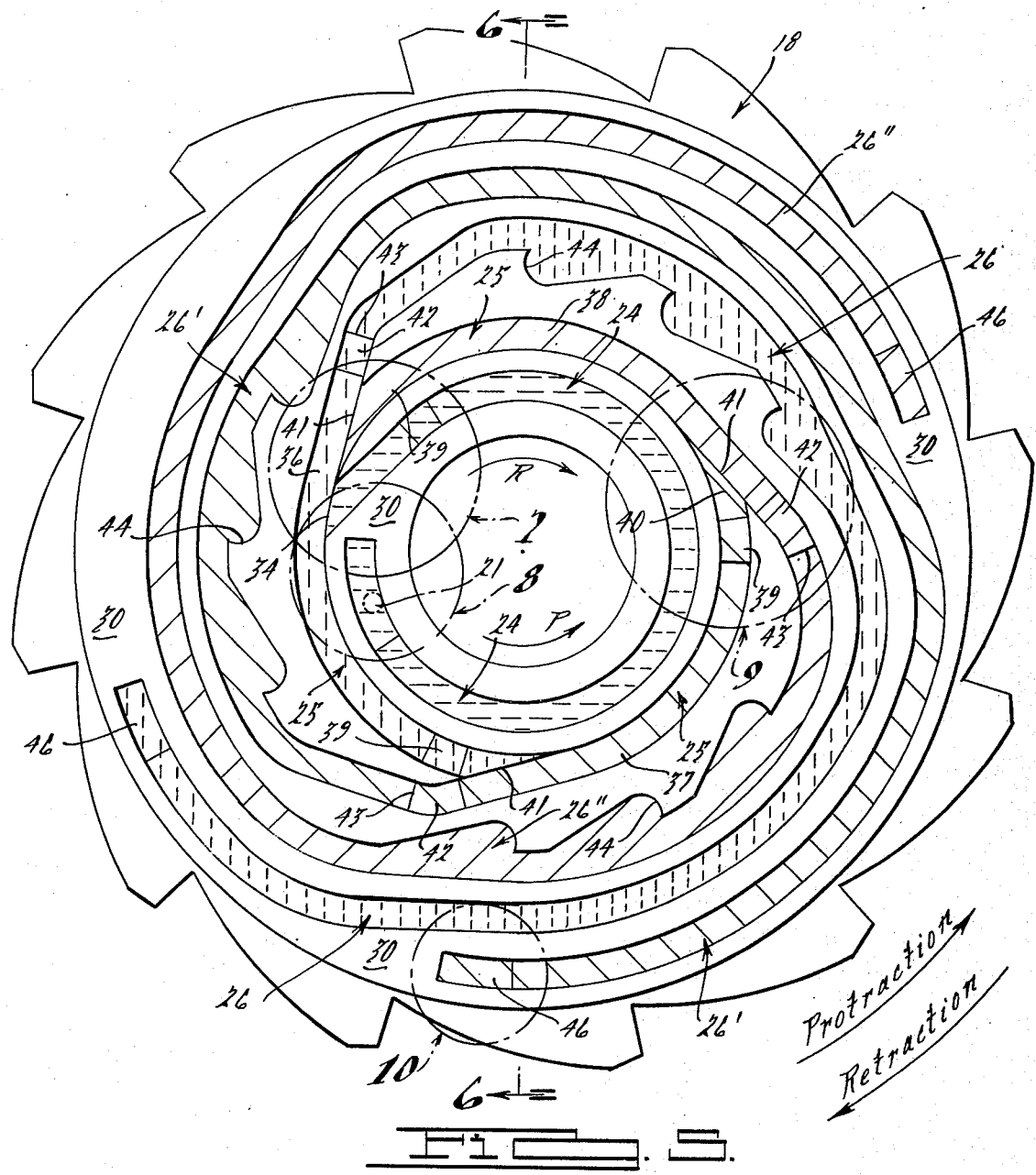
FIG. 5 is an enlarged elevational view of the control disc of the present invention with the several control tracks shown in different shadings for purposes of distinction and clarity.
Figure 6:
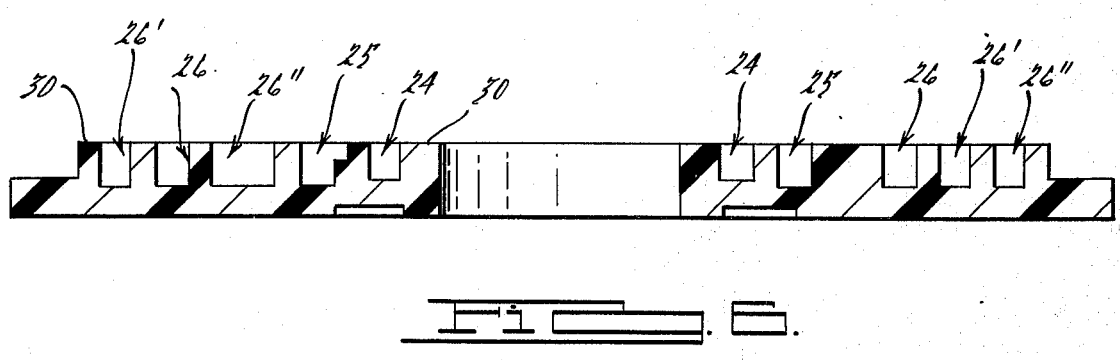
FIG. 6 is a cross-sectional view taken substantially along lines 6—6 of FIG. 5.

Referring to FIG. 1, a portion of the interior of a vehicle is shown including a seat back generally indicated at 10 and a retractor generally indicated at 12 mounted on a vertical pillar on the interior of the vehicle in the usual way. A shoulder belt 13 projects from the retractor 12 in the usual way and is mounted in the vehicle so that it can be extended over the shoulder and across the chest of the vehicle occupant and have the free end latched in the usual way.

In FIGS. 2 and 3, the retractor 12 is illustrated as comprising a housing 14 within which a spool-type retractor generally indicated at 15 is mounted. The spool 15 includes a pair of end flanges 16 and 17, each of which is formed with the usual sprocket teeth and actuated in a manner such as that described in U.S. Pat. No. 3,667,698.

According to the present invention, a control mechanism is combined with a conventional belt retractor and includes a disc generally indicated at 18 which is formed of a suitable synthetic plastic which may be molded to incorporate the track or race configurations of the present invention.

Such disc 18 is formed with ratchets corresponding to those of flanges 16 and 17; and in the embodiments illustrated, the disc 18 is fixed to the outer face of the flange 16 for rotation therewith. The disc 18 is formed to provide the tracks or races generally described above. Each of the tracks is formed with a flat bottom and perpendicular side walls.

A stop-follower 20 is positioned to have an inwardly bent end 21 received slidably within the tracks. The stop-follower 20 is in the form of a spring wire (FIG. 3) having one end anchored at 22 so that the inwardly directed end 21, which projects through a slot 23 in the housing, is slidably received relative to the grooves or races, depending upon the relative rotative position of the disc. The spring wire 20 is mounted so that it is both radially urged toward the center of the disc as well as resiliently urged toward the face of the disc, or toward the bottom of the tracks.

The configurations and communicatng arrangements of the tracks in cooperation with the stop-follower 21 are included in the inventive features which provide the controls of the present invention.

the essential elements of the track controls may be most clearly seen in reference to FIG. 16. A first circuitous track is generally indicated at 24, a second circuitous track is generally indicated at 25 and a third control track, which is in open communication with track 25, is generally indicated at 26.

The terms "clockwise" and "counter-clockwise" will be used for descriptive purposes and as related to FIGS. 5 and 16.

The track or race 24 is generally circuitous in form and is substantially concentric with the center of the disc except for the end indicated at 28 (FIG. 16) which extends into communication with the track 25. One end of the track 24 terminates in a upwardly extending ramp 29 (clockwise) and as best shown in FIGS. 8 and 12.

The outermost surface of the disc is indicated at 30 and the end of the ramp 29 terminates at the disc surface 30. A continuation of the surface 30 drops into slot 34 and is separated by a stop wall 31 (FIGS. 16 and 12).

The end of the track 24 adjacent the communication with track 25 is formed with a ramp 32 terminating in a flat 33 below the surface 30 and communicates with the section 25 with a stop wall 34 formed at the juncture (FIGS. 7 and 11).

The circuitous track 25 may be considered as comprising three sections 36, 37 and 38. Sections 36, 37 and 38 are placed in communication with each other at their junctures of communication by means of ramps 39 which terminate on flate 40 below surface 30. Such flats terminate in stop shoulders 41 (FIGS. 9 and 13). There are three of such ramps 39 and stops 41 in the embodiment illustrated, disposed equally therearound (FIG. 5).

With reference to the phantom section of FIG. 16, only one of such ramps and one of such elements are shown in full lines, the others being illustrated in phantom. They are, however, shown as actually used in FIG. 5.

Track 25 communicates with a third control track 26 over a ramp 42 which terminates in a transverse stop shoulder 43 at the juncture of tracks 25 and 26 (FIGS. 9 and 14). The control section 26 is generally in the form of a spiral, as best seen in FIG. 16; and, adjacent the entrance in the track on the inner wall, is formed with a plurality of hook-stops 44, there being three in the embodiment illustrated for each of the control sections. The function of such stops 44 will be described hereinafter.

The track 26 continues in a spiral fashion around the disc where it terminates in a ramp 46 leading to the top surface 30 of the disc (FIGS. 10 and 15).

There are three such control tracks provided (FIG. 5) indicated as 26, 26' and 26'', each of which is of like configuration and each of which communicates in a like way with track sections 36, 37 and 38, respectively, of track 25.

In FIGS. 5 and 16, the stop-follower 21 is shown as disposed within track 24 which is in its initial position that it would assume before the belt is protracted. The stop-follower is of such a diameter that it may be received within and slidably engage the side walls of the tracks. As the belt is protracted, the disc 18 is rotated in a counter-clockwise direction as indicated by the term "protraction" and the letter "P" in FIGS. 5 and 16. During such rotation of the disc, the stop-follower 21 is caused to pass up over the ramp 29 along the flat 30 and drops into the end 28 of the track 24. Continued rotation of the disc in the counter-clockwise direction causes the stop-follower 21 to drip down under ramp 32 into the bottom of the groove 24 and the stop-follower would continue to circulate in that track so long as the belt also continues to protract.

In the normal use of the belt retractor, the protraction would continue until it was extended to such a length that the free end could be latched in the usual way. This normally means a slight retraction of the belt clockwise and the belt would then be pressed against the chest of the user. At the end of the protraction, the position of the stop 21 would be within the groove 24, for example, in the position shown at 21a (FIG. 16). The retraction to a snug position against the user would then cause the stop 21 to move from the relative position shown at 21a over the ramp 32, the flat 33, and drop into the track section 36 of track 25 ahead of the stop wall 34 (FIGS. 7, 11 and 16). The stop 21 is thus prevented from returning into groove 24 as it has moved to a relative track position 21b (FIG. 16).

A slight protraction of the belt by the user, causes a relative counter-clockwise movement of the disc 18 and will cause the stop 21 to move over the ramp 42 past the stop shoulder 43 into the track control section 26. As that limited protraction continues, the stop 21 would be urged into a position behind one of the hook-stops 44 such as that indicated at 21c (FIG. 16).

When the user then releases the belt, the stop 21 would be snapped into the closest hook-stop 44 and prevent any clockwise movement of the disc, i.e., prevent any further retraction of the belt. Thus, the pressure exerted by the belt is released or relaxed. It is thus within the operator's control to protract the belt to the desired position and allow it to drop into the selected hook-stop 44.

With the stop engaged within the lock 44, the belt cannot be further retracted nor can the belt be further protracted in the event of a sudden change in vehicle velocity because the normal components of the mechanism would be effective to prevent that protraction.

The belt may be returned to its initial position by the occupant protracting the belt so that the disc is moved counterclockwise. The stop 21 assumes a relative position to the end of track 26, up ramp 46 to the top surface 30 of the disc and it will then snap back radially inwardly into its initial position.

Furthermore, to assure this return at any position of the stop 21 in the tracks when the belt is unlatched, a mechanism is provided (FIGS. 2, 3 and 4) which comprises a magnetically responsive arm 50 which is pivotably mounted on the housing as indicated at 51 and which has an arm 52 with a light spring engaging element 52' which extends under the spring wire 20, in engagement therewith as the spring wire moves radially of the disc. The upper end of arm 50 is generally in the form of a disc 53 which is disposed adjacent the end of a magnetic solenoid 54 supported on the frame. The spring element functions to space the disc portion 53 away from the magnet of the solenoid to provide for the most effective action of the magnetic field on the arm 50. The solenoid 54 is connected by a wire to a suitable electric source which is automatically actuated when the belt latch is released. This causes the arm 50 to pivot against the spring wire 20, thus lifting or disengaging it from whichever of the grooves that it may be disposed and allowing it to snap back radially to its initial postion.

As further retraction takes place, which means that the disc 18 is moved in a clockwise direction, the stop 21 would be moved into track 25 causing it continually to circulate in sections 36, 37 and 38 of track 25 over the ramps 39 until the belt is fully retracted.

The action for only one of the control tracks is described in FIG. 16; but, in actuality and preference, as shown in FIG. 5, there are three of such control tracks 26, 26' and 26" spaced equally around the disc. The reason for the plurality of such control tracks is to permit a more sensitive positioning of the stop relative to the stop-followers for one-third revolution rather than a full revolution. This gives the user a more selective limitation of belt protraction to the stop position to provide the user with the desired relief.

What is claimed is:

1. A safety belt retractor comprising a frame and a spool mounted on said frame, means resiliently biassing said spool in a belt retraction direction, said spool having an end flange combined with improved means for controlling protraction and retraction of the belt, said means including a disc attached to said end flange for rotation therewith, said disc having a first annular track adapted to receive a stop-follower resiliently urged into said track, a second annular track disposed outwardly of said first track and in communication therewith to receive said stopfollower upon initial retraction of a withdrawn belt and to permit continuous retraction of the belt when the belt is unlatched by the user, and a third control track which communicates with the second track to receive said stop-follower upon further limited protraction of the belt, a stop in said control track engageable by said stop-follower when said limited protraction is released to prevent further retraction of the belt until released by the user.

2. A safety belt retractor comprising a frame and a belt spool mounted on said frame, means resiliently biassing said spool in a belt retraction direction, said spool having an end flange combined with improved means for controlling protraction and retraction of the belt, said means including a disc attached to said end flange for rotation therewith in one direction to permit belt protraction and in the opposite direction therewith to permit belt retraction, said disc having a first annular track adapted to receive a stop-follower resiliently urged into said track and to permit continuous following of said stop-follower in said first track during initial protraction of said belt, a second annular track disposed outwardly of said first track and in communication therewith to receive said stop-follower upon reverse rotation of said disc in said opposite direction upon initial retraction of said belt and to permit continuous retraction of the belt when the belt is unlatched by the user, and a third control track which communicates with the second track to receive said stop-follower upon further limited protraction of the belt and rotation of said disc in said one direction, a stop in said control track engageable by said stop-follower when said limited protraction is released to prevent further retraction of the belt until released by the user.

3. A safety belt retractor comprising a frame and a belt spool mounted on said frame, means resiliently biassing said spool on a belt retraction direction, said spool having an end flange combined with improved means for controlling protraction and retraction of the belt, said means including a disc attached to said end flange for rotation therewith in one direction to permit belt protraction and in the opposite direction therewith to permit belt retraction, said disc having a first annular track adapted to receive a stop-follower resiliently urged into said track and to permit continuous following of said stop-follower in said first track during intial protraction of said belt, a second annular track disposed outwardly of said first track and in communication therewith to receive said stop-follower upon reverse rotation of said disc in said opposite direction upon initial retraction of said belt and to permit continuous retraction of the belt when the belt is unlatched by the user, and a third control track which communicates with the second track to receive said stop-follower upon further limited protraction of the belt and rotation of said disc in said one direction, a stop in said control track engageable by said stopfollower when said limited protraction is released to lock said disc against rotation in said opposite direction to thereby prevent further retraction of the belt until released by the user.

4. A safety belt retractor according to claim 2 wherein a stop is provided at the juncture between said first and second tracks to prevent the return of said stop-follower to said first track after it has passed to said second track.

5. A safety belt retractor according to claim 4 in which said stop is formed by a ramp raising said stop-follower above the floor of said first track and a wall dropping to the level of the floor of said second track over which the stop-follower drops.

6. A safety belt retractor according to claim 2 wherein said stop-follower is in the form of an elongated spring wire having one end anchored and the opposite end disposed at an angle to its major length and receivable in said tracks during rotation of said disc.

7. A safety belt retractor according to claim 6 wherein a movable release arm is disposed under the major length of said spring wire, and means to actuate said arm upon release of said belt to raise the end of said stop-follower out of the track in which it is disposed and cause it to return to its position in said second track to permit full retraction of said belt.

8. A safety belt retractor according to claim 7 in which said release arm is rigid and pivotally mounted and has a light leaf spring mounted thereon in continuous engagement with the underside of said spring wire, and in which said actuating means is a magnetic solenoid operable upon release of the belt to actuate the arm.

* * * * *